Dec. 30, 1969   G. E. WILLIAMS ET AL   3,486,197
CONVEYOR CHAIN WITH TUBULAR COOLER AND GUIDE
Filed Dec. 28, 1967   2 Sheets-Sheet 1

INVENTORS
G. E. WILLIAMS
E. C. HELD
BY
Young + Quigg
ATTORNEYS

Dec. 30, 1969   G. E. WILLIAMS ET AL   3,486,197
CONVEYOR CHAIN WITH TUBULAR COOLER AND GUIDE
Filed Dec. 28, 1967   2 Sheets-Sheet 2
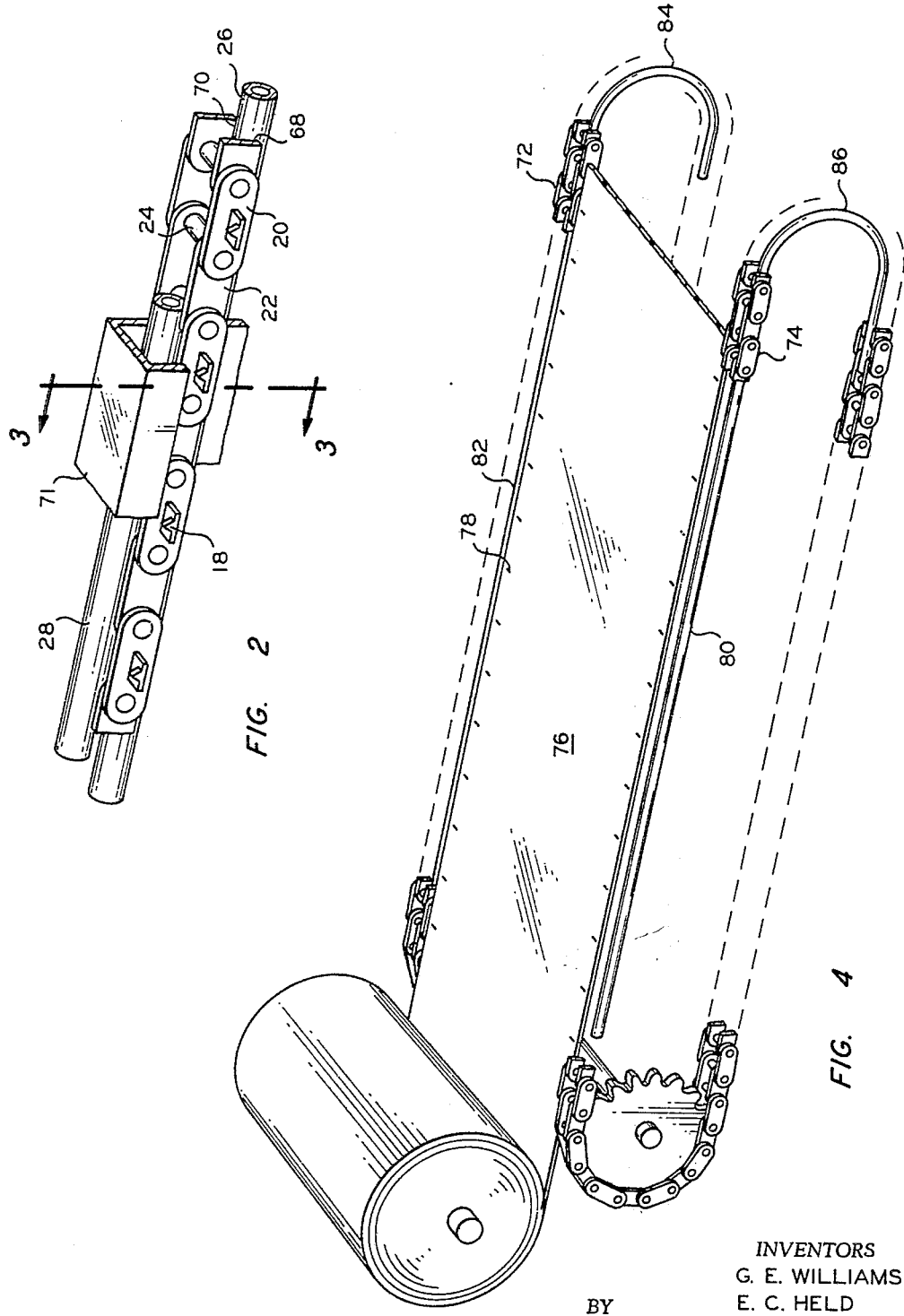
INVENTORS
G. E. WILLIAMS
E. C. HELD
BY Young + Quigg
ATTORNEYS United States Patent Office 3,486,197
Patented Dec. 30, 1969

3,486,197
CONVEYOR CHAIN WITH TUBULAR COOLER AND GUIDE
George E. Williams and Edward C. Held, Jr., Bartlesville, Okla., assignors to Phillips Petroleum Company, a corporation of Delaware
Filed Dec. 28, 1967, Ser. No. 694,271
Int. Cl. B29c 17/00
U.S. Cl. 18—19
8 Claims

ABSTRACT OF THE DISCLOSURE

A conveyor chain, for instance, one of a pair of chains used to convey a heated plastic sheet to the molding station, slides over a tubular guide. This guide is cooled, for instance, by the circulation of water within it, so as to cool the chain.

Background of the invention

This invention relates to a combination guide and cooling system for conveyor chains.

Because of its inherent low cost, thermoforming has become one of the most attractive techniques for the fabrication of plastic articles. Initially, thermoforming involved simply cutting a sheet of plastic material to a convenient size, heating it to a forming temperature, placing it over the open top of a female mold cavity and drawing a vacuum between the sheet and the inner walls of the cavity. In recent years this technique has become more sophisticated. For one thing, instead of cutting a separate sheet for each article a continuous sheet is generally unwound from a roll and advanced through a heating zone to a molding station. It has also recently been found that two parallel sheets of plastic can be spaced apart a short distance and conveyed through a heating zone and into a molding zone wherein a pressure differential is created between each sheet and its respective mold, at which time the sheets are joined around their periphery so as to form a hollow article resembling a blow molded hollow article. An operation of this type is described in Held, U.S. 3,099,043.

These advanced techniques present particular problems relating to the conveying mechanism. The conveying mechanism is used to advance the sheets through a heating zone so as to heat the portion of the sheet between the conveying chains to a moldable condition. However, this tends to heat the conveyor chains, which is undesirable since, if the conveyor mechanism is hot at the point where it grips the sheet, the sheet will become soft in this area and will easily tear loose from the chain.

This problem is aggravated in situations where it is desired to transfer the sheet both forward and up or down. For instance, when forming hollow articles from two sheets, it is desirable to heat the sheets while in a widely spaced relationship so as to achieve even heating on both sides of the sheets, and then to advance and converge the sheets into the molding station so as to have the sheets in a closely spaced parallel relationship while they are between the molds in the molding station, thereby minimizing the draw on the sheets as the molds close.

Summary of the invention

It is an object of this invention to provide a simple and inexpensive means of guiding and cooling a conveyor chain.

It is another object of this invention to provide a conveying means for carrying two wisely spaced sheets of normally solid thermoplastic material through a heating zone and thereafter forward and inward into a closely spaced parallel relationship within a molding zone.

It is a further object of this invention to eliminate sagging of the conveyor chains as they advance sheet material through a heating zone preparatory to thermoforming in a molding zone.

In accordance with this invention a conveyor chain slides over a cooled tubular guide.

Brief description of the drawings

In the drawings, forming a part hereof, wherein like reference characters denote like parts in the various views, FIGURE 2 is a detailed view of one segment of a chain of FIGURE 1; FIGURE 4 is an axonometric view of the top of a conveyor mechanism in accordance with another embodiment of the instant invention.

Description of the preferred embodiments

The tubular cooler and guide of the instant invention is of particular utility in guiding and cooling chains used to convey sheets of normally solid thermoplastic material through a heating zone to a molding zone wherein said sheets are fabricated into finished parts by means of a thermoforming operation. It is apparent that such sheets must be gripped in some way by the conveying mechanism as they are carried along through the heating zone and into the molding zone. One convenient gripping means is simply to have an upwardly extending piercing means carried by link plates on the chain (or an outwardly and upwardly projecting means to carry the sheet in such a manner that the edge of the sheet does not extend over the chain) which pierce the outer edegs of the sheet. It is apparent that in this or any other gripping means, the sheet material will tear away from the gripping means if, while passing through the heating zone, the chain itself is heated sufficiently to melt the plastic in the area where it is being gripped.

The novel tubular cooling guide of the instant invention can be used either in apparatus for simple thermoforming of a single plastic sheet or in the production of hollow articles from two parallel spaced apart plastic sheets.

The tubular cooler and guide means can be any inexpensive tubing or pipe of an appropriate size so as to contact the rollers of the chain and not drag on the edges of the link plates. Since one of the principal advantages of the thermoforming technique for fabricating plastic articles is the inherent simplicity and low cost of this operation it can be readily seen that a complex guiding and cooling mechanism would be entirely unsuited for such an operation. Preferably the tubular cooler and guide means is a simple metal pipe. The tubular cooler and guide means is disposed longitudinally relative to the chain so that the contact between the chain and the tubular cooler and guide means is made by the rollers of the chain which roll against the tubular cooler and guide means. Such a guide and support results in very low friction, since there is very little friction generated by the rollers rolling over the cooled tubular guide. This then allows supporting the chain, and hence the plastic sheet, over long distances without the chain sagging and without the need for numerous sprockets. Also in instances where the chains advance forwardly and inwardly or forwardly and upwardly so as to converge two parallel spaced apart sheets of thermoplastic material, the sprockets otherwise necessary to achieve this change in level of the chains can be eliminated by utilizing tubular cooling and guide means on each side of the chain. In an alternate embodiment, these sprockets can be retained, the cooling and guide means being discontinuous in the area of the sprockets.

Figure 1:
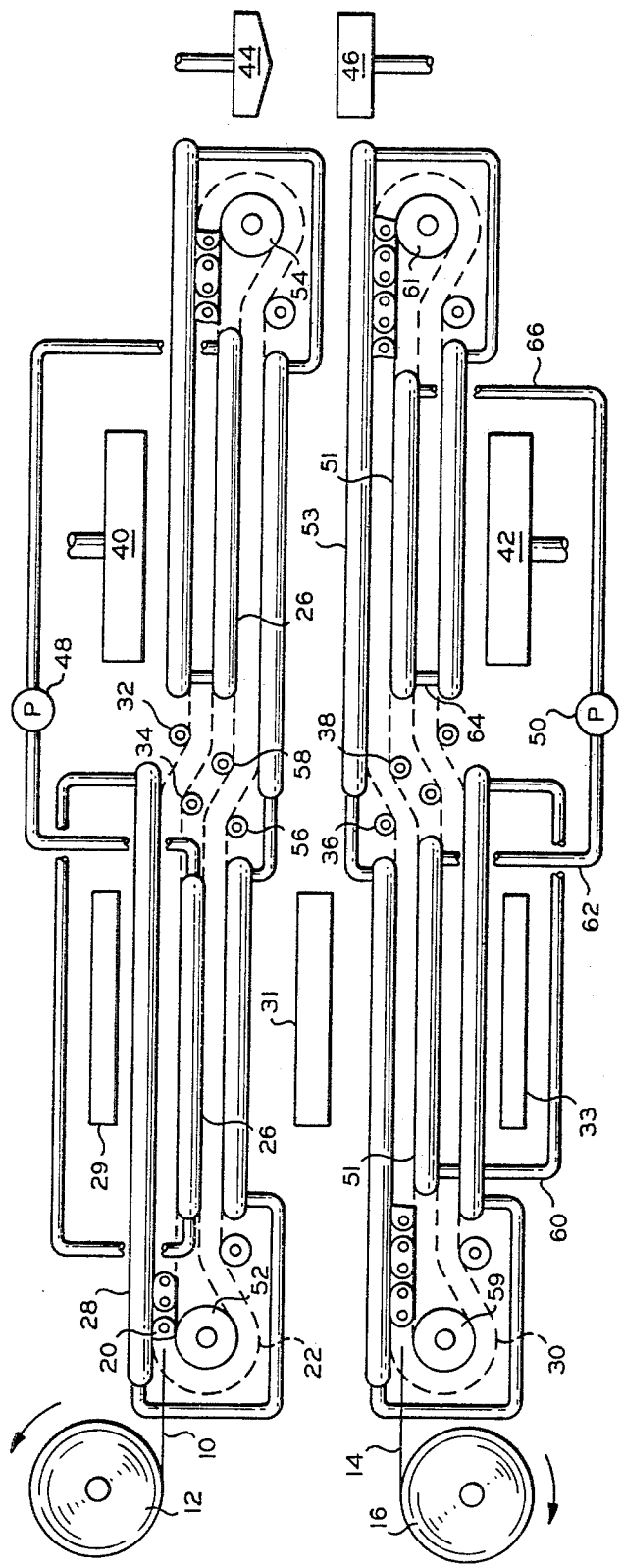
FIGURE 1 is a cross section in simplified form of one embodiment of the invention.
Figure 3:
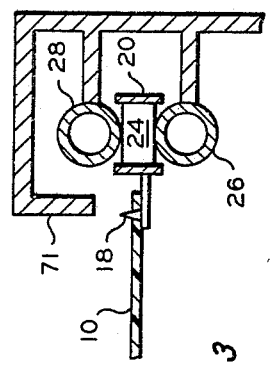
FIGURE 3 is a cross section along section lines 3—3 of FIGURE 2.

Referring now to the drawings, particularly FIGURES 1, 2 and 3, there is shown one embodiment of the invention wherein two thermoplastic sheets are conveyed through a heating zone to a molding zone utilizing a tubular cooler and guiding means in accordance with the instant invention. A first thermoplastic sheet 10 is unwound from roll 12. A second thermoplastic sheet 14 is unwound from roll 16. Said first and second thermoplastic sheets are carried by identical conveyor systems. The apparatus will be described primarily with reference to the first thermoplastic sheet, it being understood that the second thermoplastic sheet is carried by a similar set of conveyor chains. Sheet 10 is gripped along an edge thereof by outwardly and upwardly projecting piercing elements 18 (see FIGURE 2 for details) carried by link plates 20 of endless conveyor chain 22. A slotted pressure wheel can be positioned above the sheet over the spot where the edge of the sheet first contacts the conveyor chains so as to aid in causing the piercing means to penetrate the sheet. Rollers 24 of chain 22 contact tubular cooler and guide means 26 (see FIGURE 2 for details), tubular cooler and guide means 26 servicing to support, guide, and cool said chain. Positioned above rollers 24 is second tubular cooler and guide means 28. While the invention is shown in this drawing in terms of the preferred embodiment wherein a tubular cooler and guide means is positioned both above and below the endless conveyor chain, it is also within the scope of the invention to utilize only one tubular cooler and guide means as is shown in FIGURE 4. When only one tubular cooler and guide means is used it is preferably positioned below the chain so that the chain can be supported by said tubular cooler and guide means, thus eliminating the need for sprockets to maintain the chain level over a comparatively long distance. Sheet 10, gripped by said piercing elements, is conveyed by first conveyor chain 22 (and a second laterally spaced apart chain, not shown, which grips the opposite edge) through a heating zone defined by heaters 29 and 31. Sheet 14, gripped by said piercing elements, is conveyed by third conveyor chain 30 (and a fourth laterally spaced apart chain, not shown, which grips the opposite edge) through a heating zone defined by heaters 31 and 33. As endless conveyor chain 22 and endless conveyor chain 30 pass between sprockets 32 and 34, and 36 and 38, respectively, widely spaced parallel sheets 10 and 14 move forwardly and inwardly to converge into a closed spaced parallel relationship between reciprocal mold halves 40 and 42. In this molding zone between mold halves 40 and 42 the sheets are joined around the peripheral edges of the article to be formed by the closing of the molds as a pressure differential is formed between sheet 10 and mold 40 and sheet 14 and mold 42 so as to cause sheets 10 and 14 to conform to the inner contours of mold halves 40 and 42, respectively, to form a hollow article. The fused sheets are then passed into a trimming zone defined by cutter elements 44 and 46 where the finished part is trimmed from the resulting web. Cooling fluid such as water or air is circulated through the tubular cooler and guide means 26 and 28 by means of pump 48. The cooling fluid can be circulated in a closed system utilizing a heat exchanger to cool the fluid or the fluid can be passed once through the system and dumped. Temperature controllers can be utilized if desired to maintain the cooling fluid at the desired temperature. A similar pump 50 circulates cooling fluid such as water through tubular cooler and guide means 51 and 53.

In FIGURE 1 the tubular cooler and guide means 26 and 28 are shown as a single interconnected unit, although it is within the scope of the invention for such coolers and guide means to be two separate units.

At least one sprocket, such as sprocket 52 is required to advance each endless conveyor chain. Generally a sprocket such as sprocket 54 will be used at the opposite end, although this sprocket can be eliminated and the chain rollers allowed to roll around the cooler and guide means as is shown in FIGURE 4; in such an embodiment as this, however, the tubular cooler and guide means must be carefully formed in this area so as to be smoothly curved. Similarly, sprockets 32, 34, 56 and 58, and the like can be eliminated and the chain guided to different levels by means of riding over the carefully contoured tubular cooler and guide means.

In the preferred embodiment shown in the drawings, particularly FIGURES 2 and 3 the outwardly and upwardly projecting piercing elements 18 are carried by link plates 20 in such a manner that the sheet is positioned along approximately the center line of the conveyor chain so as to minimize distortion of the sheet as the chain carrying the sheet travels between rollers 32 and 34 or 36 and 38.

It is to be noted that first tubular cooler and guide means 26 (and corresponding guide means 51 on the bottom set of conveyor chains) serves to support the bottom of the endless chain as it moves in a forward direction and serves to contact the top of this endless chain as it moves in a backward direction after having released the sheet. That is, the single guide serves in a dual function by being between the two sections of the chain. It is apparent that sprockets 52 and 54 (and corresponding sprockets 59 and 61 on chain 30) could be larger and the idler wheels eliminated, thus spacing the portion of endless chain 22 moving in a forward direction further from the section of endless chain 22 moving in a backward direction, in which case two separate sets of tubular coolers and guides could be used. Tubular cooler and guide means 51 converges to a smaller diameter at points 60, 62, 64, 66 so that an L-joint or the like can be utilized to enable connection to be made with this cooler and guide means for circulating the cooling fluid without rubbing against the edges of the link plates of the chain. Tubular cooler and guide means 26 has an identical arrangement. That is, since the tubular cooler and guide means serves to guide the chain, in addition to supporting it by contacting the rollers, by means of the edges of the link plates contacting the tubular cooler and guide means so as to prevent lateral movement, it is apparent that cooler and guide means 26 and 51 could not be connected with the outside from between the two sections of chain without first reducing them to a smaller size. See for instance FIGURE 2 where the sides of the link plate 20 of chain 22 are seen to restrain tubular cooler and guide 26 at points 68 and 70.

Referring specifically to FIGURES 2 and 3 there is shown heat shield 71 which reduces the amount of radiant heat from the heating means which can reach the conveyor chains. This shield is broken away in FIGURE 2 so as to show more clearly the relationship of the tubular coolers and guides to the chain.

Referring now to FIGURE 4, there is shown an alternate embodiment of this invention in which a single set of conveyor chains 72 and 74 convey a sheet of plastic 76. Outwardly and upwardly projecting piercing elements can be seen to have pierced the edges of the sheet at points 78 so as to grip the sheet. Tubular coolers and guide members 80 and 82 are shown to be carefully contoured at points 84 and 86 so as to allow the chain rollers to be guided and supported by these tubular cooler and guides so as to eliminate the need for a sprocket. This figure specifically shows how the sheet of plastic is conveyed by means of first and second laterally spaced apart conveyor chains, each of which grips one edge of the sheet, said chains being cooled and guided by a tubular cooler and guide means.

The drawings do not include many items of conventional equipment such as temperature controllers, chain tensioners, structural members, heating elements, and the like, but the inclusion of such elements is understood by those skilled in the art and is within the scope of the invention.

Example

Two 33 mil sheets of ethylene homopolymer having a density of 0.96 (ASTM D1505–63T) and a melt index of 0.1 (ASTM D1238–62T, Condition E) were fed into the heating section of an apparatus such as is described in FIGURES 1 to 3 having tubular cooling and guide means. The upper sheet was 3.75 inches below the upper heater and 4.5 inches above the center heater. The lower sheet was 4.0 inches below the center heater and 5.0 inches above the lower heater. After the sheets had been in the heating zones long enough to soften, they were intermittently conveyed by chain conveyors, having outwardly and upwardly projecting piercing elements, forward and inward into a closely spaced relationship between two mold halves designed to produce six one-half gallon milk bottles. The mold halves were brought together and simultaneously a vacuum pulled on each mold half. Shortly after the mold was closed, internal air pressure was introduced between the sheets to blow the sheets out into conformity with the mold halves. After the bottles had cooled sufficiently to be self-supporting the molds were opened and the parts ejected from the mold and separated from the connecting sheets. Each bottle weighed approximately 45 grams. The total cycle time was 12 seconds for the production of six one-half gallon bottles. This cycle was continued for a period of several hours with no difficulty being encountered in the way of the chains heating up and causing the plastic sheets to soften in the area where they were gripped by the piercing means.

In a similar run using identical apparatus and polymer sheets except that no tubular cooling and guide means was used, the chain tended to heat up after extended operation causing the piercing elements to soften the plastic and allow the plastic sheet to tear loose from the piercing elements. This caused wrinkling and warpage of the sheets. Also the heating of the chain caused it to expand to an extent that an undue amount of slack was created.

While this invention has been described in detail for the purpose of illustration, it is not to be construed as limited thereby but is intended to include all changes and modifications within the spirit and scope thereof.

What is claimed is:

1. Apparatus for conveying a plastic sheet comprising in combination: a first endless chain comprising rollers and link plates; a second endless chain comprising rollers and link plates; sheet gripping means carried by said link plates; said first and said second endless chains being laterally spaced apart so as to enable said sheet to be supported between said first and said second chains by means of said gripping means; at least one tubular cooler and guide disposed in parallel direction relative to each of said chains so as to contact said rollers of said endless chains to cool and guide said chains.

2. Apparatus according to claim 1 wherein said at least one tubular cooler and guide comprises two tubes, one on each side of said chain.

3. Apparatus according to claim 1 wherein said tubular cooler and guide comprises a hollow metal pipe and wherein siad apparatus comprises in addition means to circulate a cooling fluid through said pipe.

4. Apparatus according to claim 1 comprising in addition: a heating means; a mold means; and means to advance said chain so as to convey said sheet through said heating means and thereafter into said molding means.

5. Apparatus according to claim 1 comprising in addition: a heating means; and a shield to shield at least a part of said endless chains from radiant heat from said heating means.

6. Apparatus comprising in combination: a heating means; a mold means; a first endless chain comprising rollers and link plates; a second endless chain comprising rollers and link plates; a third endless chain comprising rollers and link plates; a fourth endless chain comprising rollers and link plates; sheet gripping means carried by said link plates; said first and second chains being spaced laterally apart so as to carry a first sheet therebetween and said third and fourth chains being spaced laterally apart so as to carry a second sheet therebetween, said chains being further disposed relative to each other so as to carry said two sheets in a widely spaced parallel relationship through said heating means and thereafter forward and inward into a closely space parallel relationship within said mold means; and at least one tubular cooler and guide means disposed in parallel direction relative to each of said chains so as to contact said rollers of said chains to cool and guide said chains.

7. Apparatus according to claim 1 wherein said gripping means comprises upwardly and outwardly projecting piercing elements.

8. Apparatus according to claim 7 wherein said outwardly and upwardly projecting piercing elements are disposed so as to carry said sheet along a level corresponding to about the center line of said link plates.

References Cited

UNITED STATES PATENTS

| 3,124,834 | 3/1964  | Yandierendonk | 18—1    |
| 3,132,375 | 5/1964  | Koppehele     | 18—1 XR |
| 3,193,881 | 7/1965  | Kostur        | 18—19   |
| 3,228,066 | 1/1966  | Rippstein     | 18—1    |
| 3,303,528 | 2/1967  | Rageur et al. | 18—1    |
| 3,359,600 | 12/1967 | O'Brien       | 18—19   |

WILLIAM J. STEPHENSON, Primary Examiner

U.S. Cl. X.R.

18—1